F. BOSSEN.
HARVESTER.
APPLICATION FILED MAY 7, 1910.

969,331.

Patented Sept. 6, 1910.

Witnesses
C. N. Walker
B. G. Gibbs

Inventor
Fred Bossen.
By T. Walter Fowler
His Attorney

UNITED STATES PATENT OFFICE.

FRED BOSSEN, OF PLATTE, SOUTH DAKOTA.

HARVESTER.

969,331. Specification of Letters Patent. Patented Sept. 6, 1910.

Application filed May 7, 1910. Serial No. 560,019.

*To all whom it may concern:*

Be it known that I, FRED BOSSEN, a citizen of the United States, residing at Platte, in the county of Charles Mix and State of South Dakota, have invented certain new and useful Improvements in Harvesters, of which the following is a specification.

This invention relates to certain improvements in harvesters and particularly to those which employ a bundle-carrier; the invention is in the nature of a removable attachment for the said or like machines, for handling flax and short lengths of hay and like material, and it is adapted for application to the harvester after the usual grain binding mechanism of the latter is removed.

The object of the invention is to provide a mechanism which may be readily attached to the harvester in place of the usual grain binder and adapted to retard the travel of the material to the bundle-carrier while the latter is being lowered to dump its load, said attachment being capable of reversal end for end so that its point of attachment may be at either end of the machine.

With the above and other objects in view my invention consists of the parts, and the constructions, arrangements and combinations of parts which I will hereinafter describe and claim.

Figure 1:
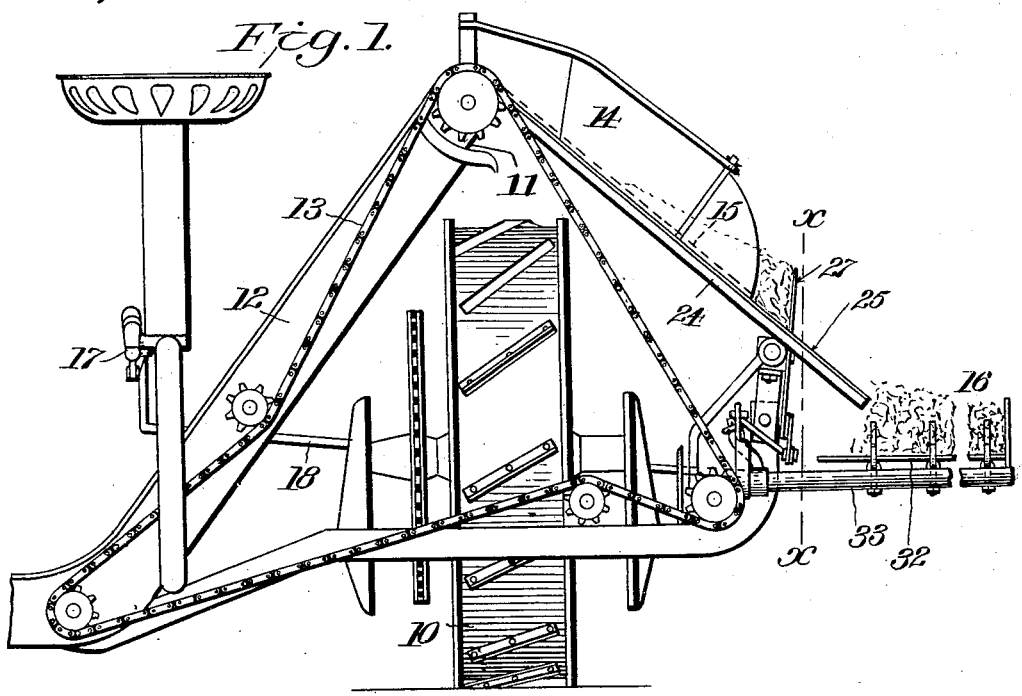
Figure 2:
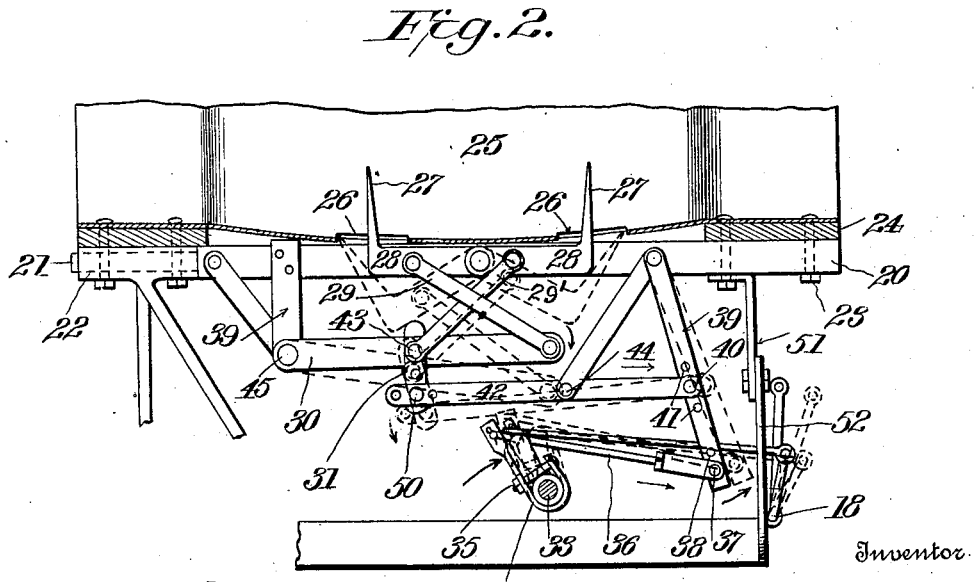

In the accompanying drawing forming a part of this specification and in which similar reference characters indicate like parts in the several views, Figure 1 is an end view of a harvesting machine showing a portion of the bundle-carrier thereof and showing the binder mechanism omitted and my attachment in position; Fig. 2 is a side elevation of the mechanism for collecting and dropping the bunches of material before the same is delivered to the bundle-carrier of the machine.

In the said drawings I have illustrated so much of a modern standard harvesting machine as will make the application and advantages of my improvements fully understood. These machines are provided with the usual traction wheel, 10, and the endless carrier, 11, which operates in a case or frame, 12, and is driven by an endless chain belt, 13, or other driving medium, as shown in Fig. 1. The machine is also provided with the usual wind-boards, 14, and the intermediate floor or platform; at one side of the machine is the well known bundle-carrier, 16. These features form no essential part of my present invention and are merely shown to establish the relation of my improvements to the platform, 15, over which the cut grain is allowed to pass from the carrier, 11, on its way to the bundle-carrier, 16. The bundle-carrier is operated by a foot-lever, 17, from which a rod, 18, extends to and connects with means for raising and lowering the bundle-carrier, this arrangement being also commonly used in the modern harvesters of the grain-binding type.

My improvements are so designed that they may be attached to the machine after first removing the usual binder attachment, with but little difficulty, and they are associated with the delivery chute or platform, 15, of the machine in such manner that the travel or feed of cut grain to the bundle-carrier, particularly such grain as is composed of short lengths, may be checked and grain prevented from being delivered to the bundle-carrier during the time the latter is being dumped of its contained load.

In carrying out my invention I employ a bar, 20, which may be in the form of a wooden or other beam, one end, 21, being turned to form a trunnion which is adapted to be detachably fitted in a bearing or box, 22, with which the machine is usually supplied, and which bearing also forms a support for one end of the usual grain-binder attachment. The opposite end of the bar or beam, 20, is secured to the frame of the machine by suitable bolts, 23, which bolts also serve to secure suitable boards, 24, which extend upwardly under the wind-boards at each side. Secured to the boards, 24, and the beam, 20, is a sheet-metal plate, 25, of a width equal to the distance between the wind-boards, said sheet or plate forming a bottom or platform over which the cut grain, flax, hay etc. is delivered as it is discharged from the platform, 15, of the machine. In order that the grain may be directed toward the center of the sheet metal plate, referred to, which is particularly desirable, in fact necessary when handling short lengths of straw, flax &c., I prefer to impart to the central transverse portion of the plate a slightly bowed or concave form, as illustrated in Fig. 2. Near the lower end the plate, 25, is formed or provided with openings, 26, through which operate the collecting fingers, 27, of my attachment. These fingers may be of metal and form right-angled extensions of the pivoted plates, 28, said plates overlapping at their inner ends and lying alongside of and being pivotally secured at their adjacent ends to the beam, 20, which underlies the aforesaid sheet-metal plate, 25.

Connected to each of the plates, 28, is a link, 29, 29', the point of connection of said links with the plates being between the pivotal center of the plates and the outer ends, and one of said links, 29', being secured to its plate at a point nearer the pivot of the latter than the other link, 29, in order that the up and down throw or movement of the fingers, 27, through the openings, 26, may be made to accord.

Rigidly secured to the beam, 20, is a bar or brace, 39, which extends below said beam and has pivotally secured to its lower end a horizontal bar, 30, the opposite end of which is pivotally connected to the lower end of the link, 29, before mentioned. At the center of the bar, 30, there is pivotally connected by the bolt, 43, a link, 31, which extends at right-angles to the bar, and to this link the lower end of the other of the links. 29, is pivotally connected, as shown in Fig. 2. The link, 31, just mentioned is provided with a series of holes whereby the pin, 43, which secures the lower end of a link, 29, to the link, 31, and bar, 30, may be made to engage either of these holes to thereby adjust the up and down movements of the collecting fingers and to better adapt the attachment to machines of different sizes, it being understood that these fingers are designed to work up and down through the openings, 26, in the plate, 25, so that they may project above the surface of said plate to collect the material passing over the plate while the bundle carrier is dumping its contained load, and when the bundle-carrier assumes its normal position, the fingers are withdrawn until their points pass below the top surface of said plate, to allow the collected bunch of material to pass over the lower or tail end of the plate onto the bundle-carrier, 16.

If the material is of short lengths, the ordinary bundle-carrier would allow much of this grain to pass between its teeth or bars and thus be strewn upon the ground, and to prevent this action and also to save the seed in these short pieces, which would otherwise be lost, I place upon the bundle-carrier a plate, 32, of sheet metal or otherwise, which receives the material discharged from the lower end of the plate, 25, and over which plate, 32, the collected material is discharged by the usual action of the bundle-carrier.

The bundle-carrier includes a shaft, 33, and in order that my attachment may be quickly and securely fastened at one point on this shaft, I employ a yoke or clip, 34, of substantially U-shape so that it may embrace the shaft and be secured by means of the bolt, 35, said yoke having an extension, to which is pinned or otherwise connected, one end of the link, 36, the opposite end of which is adjustably connected by means of a pin, 37, and holes, 38, to the lower end of a bar, 39, which bar has its upper end pivotally secured to the beam, 20, before mentioned. To the middle portion of the bar, 39, is adjustably connected by means of the pin, 40, and holes, 41, a substantially horizontal bar, 42, the other end of which is adjustably connected by a pin, 50, and series of holes, to the lower end of the link, 31, before mentioned. A diagonally disposed link extends between an intermediate portion of the bar, 42, and the pin or bolt which holds the upper end of the bar, 39, to the beam, 20. By reason of the aforesaid construction it will be apparent that when the operator moves the foot lever, 17, in one direction, the shaft, 33, will be rocked to lift the bundle-carrier and the yoke, 34, will be operated to cause the link, 36, to move in the direction of the arrow, and the lower end of the bar, 39, to be pressed to the right of Fig. 2. This action causes the bar, 42, to be moved to the right, and to swing about the pivot, 44, so that the opposite end of the bar, 42, will be moved in a downward direction pulling downwardly upon the link, 31, and causing the bar, 30, to turn upon its pivot, 45, and forcing the links, 29, to pull upon the respective plates, 28, to withdraw the collecting fingers, 27, until they shall have lowered their points below the top surface of the plate, 25, over which the grain passes. Thus any grain which had been collected by these fingers while the bundle-carrier is dumping its load would now be free to slide over the plate, 25, and onto the plate, 32, of the bundle-carrier. A reverse motion of the foot-lever lowers the bundle-carriers, and causes the parts to partake of an opposite movement and the collecting fingers to be advanced through the openings, 26, as shown in Fig. 2, to stand as temporary stops for the continuously discharging grain or material which passes over the aforesaid plate. A hanger, 51, on the beam, 20, is adapted for connection with the frame, 52, of the harvester, to thus the better sustain the attachment.

From this description it will be obvious that my attachment is capable of ready application to an ordinary harvester when the binder attachment of the latter is removed and that when it is attached it becomes a useful means for handling short lengths of cut grain and for harvesting flax, hay and like material which has a tendency to mat and arrest the continuous feed of the same to the bundle-carrier while the latter is in dumping position, thereby preventing portions of the material being strung out over the ground. When harvesting ordinary crops or straw of normal length, the attachment heretofore described may be readily removed by unbolting one end and slipping the other end out of the box or bearing, 22, and releasing the yoke, 34, from its attachment to the shaft, 33, of the bundle-carrier. The usual grain binding attachment may now be substituted for the flax or other attachment hereinbefore described.

The operation of the attachment is substantially as follows: The grain is continuously fed to the platform, 15, and the fingers, 27, being lowered this grain passes directly to the bundle-carrier and piles up thereon to form a load. When a load of the desired size is formed the operator moves the foot-lever and through the usual connections lowers the bundle-carrier to cause it to drop its load. In order to prevent further grain passing onto the bundle-carrier during the dumping movement of the latter in which case the oncoming grain, particularly if in a tangled or matted condition, would be dragged off the bundle-carrier and strewn over the ground, the operator when dumping the bundle-carrier at the same time raises the fingers and these now form stops for the grain passing over the platform, 15. The grain thus piles up against the fingers and on the platform 15, while the bundle-carrier is lowered, but as soon as the dump has been made the operator moves the foot lever to raise the bundle-carrier and at the same time the fingers, 27, are withdrawn and the material before held back and that succeeding it is now permitted to pass on to the bundle-carrier until a new load is formed. This enables me to collect all of the material in well formed bunches and without scattering portions of the grain over the ground.

What I claim as new and desire to secure by Letters Patent is:—

1. In a harvester or like machine having a platform over which the cut grain is adapted to pass, an attachment for the harvester, said attachment comprising a plurality of fingers adapted to operate vertically through the platform, and mechanism connected with said fingers and under the control of the operator, for projecting the fingers above the platform and into the path of the descending grain whereby the fingers serve as stops to arrest the discharge of the grain, said mechanism adapted, also, to withdraw the fingers to allow the accumulated grain to pass the fingers and be delivered over the discharge end of the platform.

2. The combination with a harvester having a platform and a bundle-carrier onto which the grain delivered onto the platform is received, of an attachment interposed between the bundle-carrier and the platform, said attachment including a plurality of fingers adapted to be projected and withdrawn relatively to the platform, and mechanism connected with the fingers and the bundle-carrier whereby the fingers are withdrawn coördinately with the raising of the bundle-carrier to normal position and are simultaneously projected into the path of the grain to arrest the travel of the same to the bundle-carrier when said carrier is lowered to dump its accumulated load.

3. The combination with a harvester having a platform over which the grain is adapted to pass, and a bundle-carrier onto which said grain is normally delivered, of an attachment interposed between the bundle-carrier and the platform, said attachment including a plurality of fingers adapted to operate through the platform in substantially a vertical direction, and a lever mechanism and foot lever under the control of an operator and connecting with the bundle-carrier and said fingers whereby the fingers are withdrawn when the bundle-carrier is in normal position and is receiving grain directly from the platform, and said fingers are projected above the platform to arrest the feed of the grain to the bundle-carrier coördinately with the lowering of the bundle-carrier to discharge its accumulated load.

4. The combination with a harvester having a platform over which the cut grain is adapted to pass, and a bundle-carrier upon which said grain normally accumulates, of an attachment between the bundle-carrier and platform, said attachment including a beam removably fitted to the harvester, a plurality of fingers pivotally connected to the beams, a plate forming an extension of the platform and secured to said bar, said plate having openings through which the fingers operate, an operating foot lever connecting with the bundle-carrier for raising and lowering the same, and a system of pivoted bars and connections between the bundle-carrier and the fingers whereby when the bundle-carrier is in normal position the fingers are retracted to allow the grain to pass freely and continuously to the bundle-carrier, and when the bundle-carrier is lowered to dump its load, the fingers are projected into the path of the grain to arrest the further delivery of the same to the bundle-carrier, said fingers being retracted coördinately with the return of the bundle-carrier to normal position.

5. An attachment for harvesters and the like comprising a beam and means whereby it may be detachably connected to the frame of a harvester or like machine, a metal plate secured to the beam having its central portion bowed or concaved to direct the grain centrally thereon, said plate having a plurality of openings through it, a plurality of pivotally mounted fingers carried by the beam and adapted to operate through said openings, crossed links connected to the fingers, and pivoted bars and link-connections with the first-named links for operating the latter to cause the fingers to be projected and withdrawn relatively to the upper surface of said plate.

6. An attachment for harvesters and the like comprising a beam and means whereby it may be detachably connected to the frame of a harvester or like machine, a metal plate secured to the beam having its central portion bowed or concaved to direct the grain centrally thereon, said plate having a plurality of openings through it, a plurality of pivotally mounted fingers carried by the beam and adapted to operate through said openings, crossed links connected to the fingers, pivoted bars and link-connections with the first-named links for operating the latter to cause the fingers to be projected and withdrawn relatively to the upper surface of said plate, said mechanism including a bar pivotally secured at one end having one of said links connected to the opposite end, a link pivotally connected to the central portion of said bar and to the lower end of the other of said links, a second horizontal bar connected to the lower end of the second-named link, a bar pivotally connected at its upper end of said beam and having one end of the second-named bar connected to its intermediate portion, a diagonally arranged bar connecting with the intermediate portion of the second-named bar and pivotally secured to the beam, a link pivotally connecting with the third-named bar, and a yoke connected to the last-named link and adapted for attachment to an independent machine.

In testimony whereof I affix my signature in presence of two witnesses.

FRED BOSSEN.

Witnesses:
  T. W. FOWLER,
  C. W. FOWLER.